US009632704B2

United States Patent
Gensler, Jr. et al.

(10) Patent No.: US 9,632,704 B2
(45) Date of Patent: Apr. 25, 2017

(54) MANAGEMENT OF PHYSICAL EXTENTS FOR SPACE EFFICIENT STORAGE VOLUMES

(71) Applicant: INTERNATIONAL BUSINESS MACHINES CORPORATION, Armonk, NY (US)

(72) Inventors: Robert S. Gensler, Jr., Beavercreek, OH (US); Lisa J. Gundy, Tucson, AZ (US); Christopher J. Miller, Tucson, AZ (US); Jeffrey R. Suarez, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 130 days.

(21) Appl. No.: 14/617,581

(22) Filed: Feb. 9, 2015

(65) Prior Publication Data

US 2016/0231946 A1    Aug. 11, 2016

(51) Int. Cl.
*G06F 12/00* (2006.01)
*G06F 3/06* (2006.01)

(52) U.S. Cl.
CPC .......... *G06F 3/0608* (2013.01); *G06F 3/0644* (2013.01); *G06F 3/0662* (2013.01); *G06F 3/0665* (2013.01); *G06F 3/0683* (2013.01)

(58) Field of Classification Search
CPC .... G06F 3/0608; G06F 3/0644; G06F 3/0662; G06F 3/0665; G06F 3/0683
See application file for complete search history.

(56) References Cited

U.S. PATENT DOCUMENTS

| | | | |
|---|---|---|---|
| 6,675,268 B1 | 1/2004 | DeKoning et al. | |
| 8,046,543 B2 | 10/2011 | Loebach | |
| 8,239,648 B2 | 8/2012 | Goebel et al. | |
| 2007/0260842 A1* | 11/2007 | Faibish | G06F 3/061 711/170 |
| 2012/0233434 A1 | 9/2012 | Starks et al. | |

OTHER PUBLICATIONS

U.S. Appl. No. 14/617,613, filed Feb. 9, 2015, titled "Management of Extents for Space Efficient Storage Volumes By Reusing Previously Allocated Extents".
List of Related IBM patents and applications for U.S. Appl. No. 14/617,581, dated Feb. 9, 2015, 2pp.
Office Action dated Sep. 8, 2016, pp. 15, for U.S. Appl. No. 14/617,613, filed Feb. 9, 2015.
Response dated Dec. 8, 2016, pp. 9, to Office Action dated Sep. 8, 2016, pp. 15, for U.S. Appl. No. 14/617,613, filed Feb. 9, 2015.
Notice of Allowance dated Jan. 19, 2017, pp. 13 for U.S. Appl. No. 14/617,613, filed Feb. 9, 2015.

\* cited by examiner

*Primary Examiner* — Shawn X Gu
(74) *Attorney, Agent, or Firm* — Rabindranath Dutta; Konrad Raynes Davda & Victor LLP

(57) ABSTRACT

A storage controller maintains extent space efficient storage volumes in a primary allocation space and a secondary allocation space. An indicator is used to indicate that extents of the secondary allocation space are available for an extent pool, without releasing the extents from the secondary allocation space.

18 Claims, 10 Drawing Sheets

MANAGEMENT OF PHYSICAL EXTENTS FOR SPACE EFFICIENT STORAGE VOLUMES

BACKGROUND

1. Field

Embodiments relate to the management of physical extents for space efficient storage volumes.

2. Background

A storage controller may be coupled to one or more of a plurality of hosts. The storage controller may manage a plurality of storage devices, such as disk drives, tape drives, etc., that are coupled to the storage controller. The plurality of hosts may access data stored in the storage devices via the storage controller.

The storage volumes stored in the storage devices may be maintained as space efficient storage volumes. In space efficient storage volumes, the storage volumes may be thinly provisioned which means that physical storage space is not allocated to the storage volumes until a write to the storage volumes requires the space. The amount of space that is allocated is based on the amount of data that is written to the storage volumes. In space efficient storage volumes, the logical space defined for the storage volumes exceeds the physical space allocated to the storage volumes.

In space efficient storage volumes, the space for the storage volumes are allocated when the write operations actually write tracks, extents, blocks, or other storage units to the storage volumes. If the unit for storing data is an extent, then the space efficient storage volumes are referred to as extent space efficient storage volumes.

SUMMARY OF THE PREFERRED EMBODIMENTS

Provided are a method, a system, and a computer program in which a storage controller maintains extent space efficient storage volumes in a primary allocation space and a secondary allocation space. An indicator is used to indicate that extents of the secondary allocation space are available for an extent pool, without releasing the extents from the secondary allocation space.

In additional embodiments, a determination is made that extents available in the extent pool have fallen below a threshold number. One or more extents are released from the secondary allocation space to add to the extent pool, in response to determining that the indicator indicates that extents of the secondary allocation space are available for the extent pool and in response to determining that the extents available in the extent pool have fallen below the threshold number.

In further embodiments, a determination is made that a predetermined period of time has elapsed since the indicator started indicating that the extents of the secondary allocation space are available for the extent pool. One or more extents are released from the secondary allocation space to add to the extent pool, in response to determining that the indicator indicates that extents of the secondary allocation space are available for the extent pool and in response to determining that the predetermined period of time has elapsed since the indicator started indicating that the extents of the secondary allocation space are available for the extent pool.

In yet additional embodiments, the primary allocation space and the secondary allocation space are allocated via an application, and the primary allocation space and the secondary allocation space are allocated to the application for use by the application.

In certain embodiments, the extent pool is comprised of extents physically stored in one or more storage devices coupled to the storage controller.

In further embodiments, the secondary allocation space is allocated to an application, in response to the primary allocation space being full. Data is written to the secondary allocation space subsequent to the secondary allocation space being allocated, and the primary allocation space being full.

In yet further embodiments, if the secondary allocation space is not marked with the indicator then extents in the secondary allocation space are allocated for an application and are unavailable to the extent pool.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Technical Problem in Space Efficient Volumes

In certain disk storage systems, thin provisioning may be used. Thin provisioning uses a type of space efficient volume referred to as Extent Space Efficient (ESE) volumes. Physical storage for ESE volumes is allocated from the extent pool one extent at a time, when the physical space is needed, rather than being full allocated (i.e., fully provisioned) up front at configuration time. The ESE volumes may be defined up to the maximum size allowed by the system and the storage controller. As data is written, the storage subsystem may allocate physical space to the ESE volume in pre-defined extents. When data is deleted, and the operating system software notifies the storage subsystem that the storage is no longer needed, the physical space may be released back to the extent pool, available to be used by other ESE volumes.

A significant problem introduced by ESE volumes, especially with the use of batch jobs that utilize temporary datasets, is the potential for thrashing as a dataset is written and deleted, and as another dataset is written and deleted, potentially to the same ESE volume. So, an extent may be allocated, released to the extent pool, and then a host initiated write may substantially immediately be directed to the same volume and physical location that was released. This thrashing may negatively impact the storage subsystem performance when using ESE volumes. Certain embodiment are directed towards reducing the possibility of thrashing when extent space efficient storage volumes are used.

Exemplary Embodiments

Figure 1:
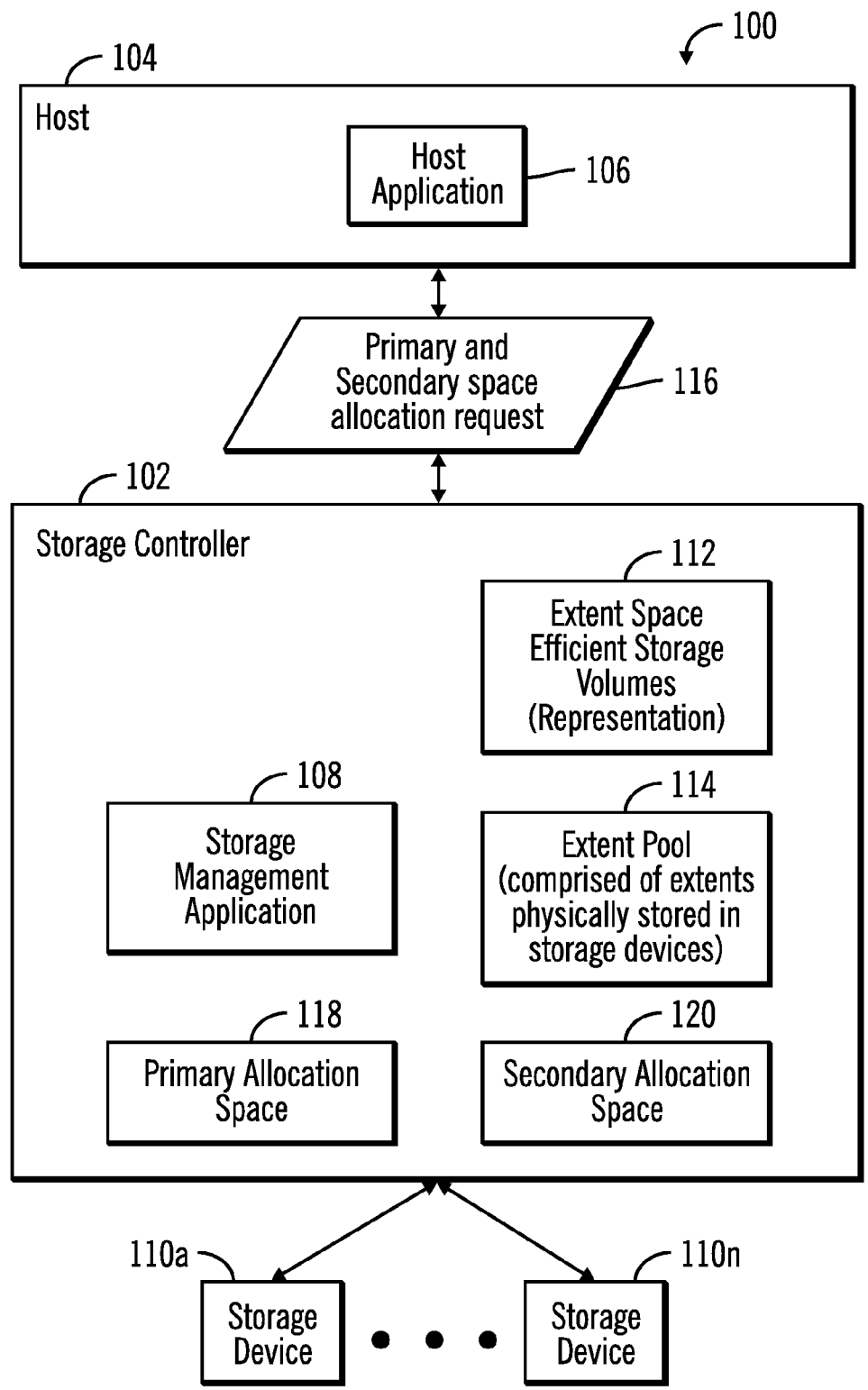
FIG. 1 illustrates a block diagram of a computing environment comprising a storage controller coupled to a host, in accordance with certain embodiments.

FIG. 1 illustrates a block diagram of a computing environment 100 comprising a storage controller 102 coupled to a host 104 via a network or a direct link, in accordance with certain embodiments.

The storage controller 102 and the host 104 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102 and the host 104 may be elements in any suitable network, such as, a storage area network, a wide area network, the Internet, an intranet. In certain embodiments, storage controller 102 and the host 104 may be elements in a cloud computing environment.

In certain embodiments, the storage controller 102 is coupled to the host 104 via a suitable network such as the Internet, an intranet, a storage area network, etc. A host application 106 executes in the host 104 and a storage management application 108 executes in the storage controller 102, where the host application 106 and the storage management application 108 may be implemented in software, hardware, firmware or any combination thereof.

The storage controller 102 controls access to one or more storage devices 110a ... 110n that are coupled to the storage controller 102. The storage devices 110a ... 110n may include any suitable storage devices such as magnetic disk drives, tape drives, solid state drives, etc.

In certain embodiments, the storage management application 108 that executes in the storage controller 102 maintains data in the storage devices 110a ... 110n in extent space efficient storage volumes 112 and maintains an extent pool 114 that is comprised of extents physically stored in one or more of the storage devices 110a ... 110n.

The host application 106 may generate a primary and a secondary storage space allocation request 116 prior to space being allocated for the host application 106. On receiving the primary and secondary space allocation request 116, the storage controller 102 generates a thin provisioned primary allocation space 118 and a thin provisioned secondary allocation space 120 for the host application 106. The initial space allocated to the host application 106 is the primary allocation space 118, and if space is needed later on the additional allocated space to the host application 106 is the secondary allocation space 120. The primary allocation space 118 and the secondary allocation space 120 when allocated are both comprised of extents taken from the extent pool 114.

If the host application 106 fluctuates in adding and removing datasets, thrashing of extents may happen. Certain embodiments provides a policy handler in the storage management application 108 that incorporates a delay in the release of extents from the secondary allocation space 120 when the storage allocation space 120 becomes empty. This delay holds the secondary allocation space 120 in place for the host application 106 to ensure that the secondary allocation space 120 does not immediately return to the extent pool 114 for being available to other applications, and as a result avoids thrashing of extents.

In addition to keeping the secondary allocation space 120 for the host application 106, a cleanup procedure may follow to ensure there are no orphaned extents in the secondary allocation space 120 when data is deleted. During the cleanup procedure, the secondary allocation space 120 may be flagged or marked as "soft released", i.e., the extents of the secondary allocation space 120 available to the extent pool 114 but not yet released from the secondary allocation space 120. When a threshold delay expires or when space is needed by the extent pool 114, the release of the secondary allocation space 120 sends the empty extents back to the extent pool 114. In addition, when space is soft-released and not reused within the delay period, the storage controller 102 may automatically mark that space as a candidate to be commit-released, or permanently released.

Therefore, in certain embodiments, when a space release request is initiated on a thin provisioned volume, the physical space for the thin provisioned volume allocated in the extent pool 114 is in an indeterminate state until the storage subsystem comprised of the storage controller 102 and the storage devices 110a ... 110n actually releases the space to the extent pool 114. Making the storage management application 108 aware of all states of extents in the extent pool (allocated, unallocated but not yet physically freed, and unallocated and physically freed) allows the storage management application 108 to select space for a write. Certain embodiments obtain volume allocation information via a new query. Then, the storage management application 108 determines what space may be unallocated but not yet physically freed in the extent pool 114 and select that space to perform the write. This process when combined with a small delay in the microcode between the request to free space and the actual freeing of the physical space may alleviate potential thrashing that may occur within am extent pool when there is a lot of allocate and delete processing occurring, such as during a nightly batch process, a database reorganization, or processes that require the allocation and deletion of temporary datasets.

Figure 2:
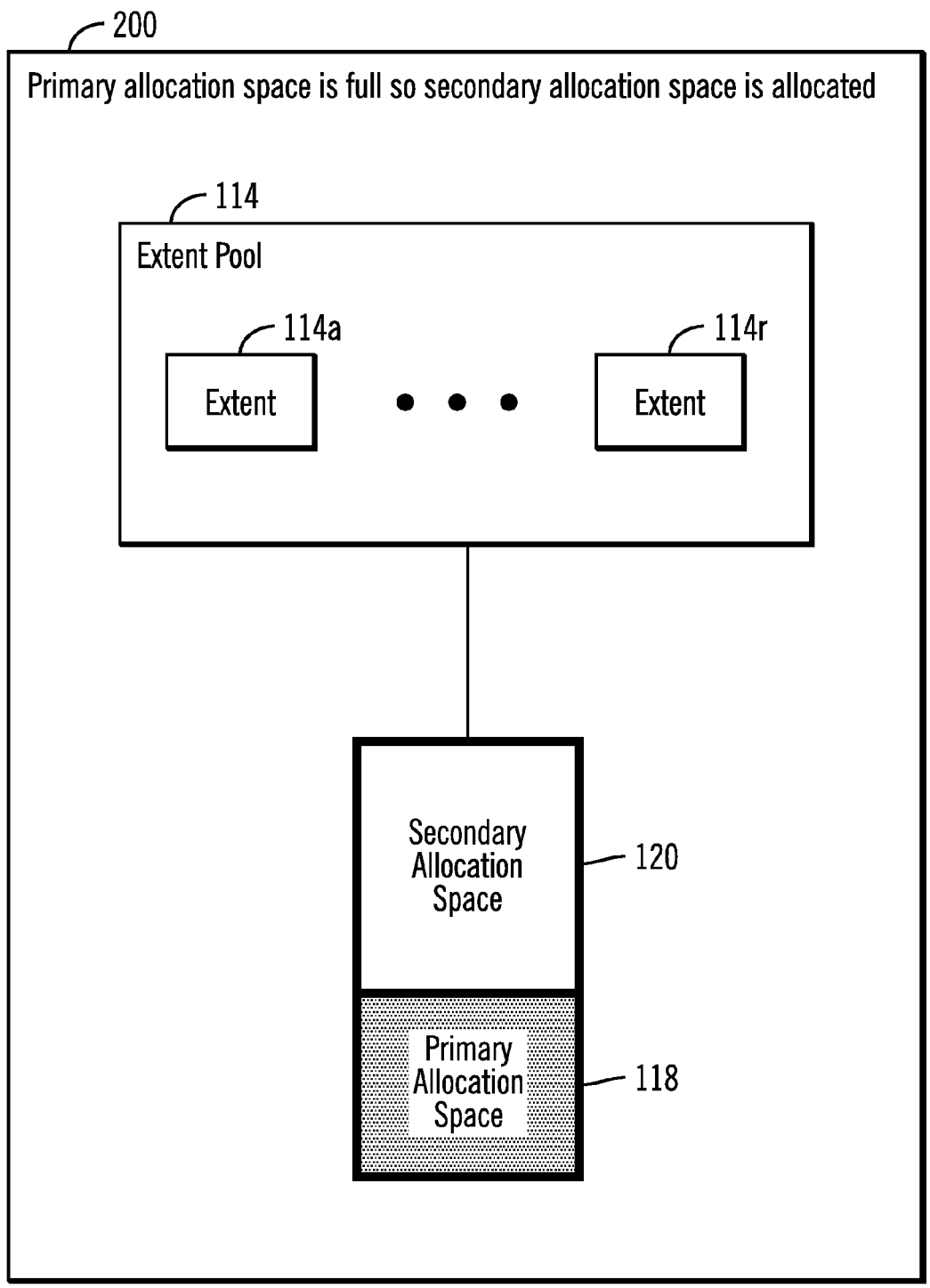
FIG. 2 illustrates a block diagram that shows how a primary allocation space is full so that a secondary allocation space is allocated, in accordance with certain embodiments.

FIG. 2 illustrates a block diagram 200 that how a primary allocation space 118 is full so that a secondary allocation space 120 is allocated, in accordance with certain embodiments. The extent pool 114 comprised of a plurality of extents, where one or more of the plurality of extents may be allocated, unallocated but not yet physically freed, and unallocated and physically freed. When the primary allocation space 118 is full (as shown by the shading of the primary allocation space 118, only then is the secondary allocation space 120 allocated to the host application 106 as extent space efficient storage volumes 112 are being used for storing the data.

Figure 3:
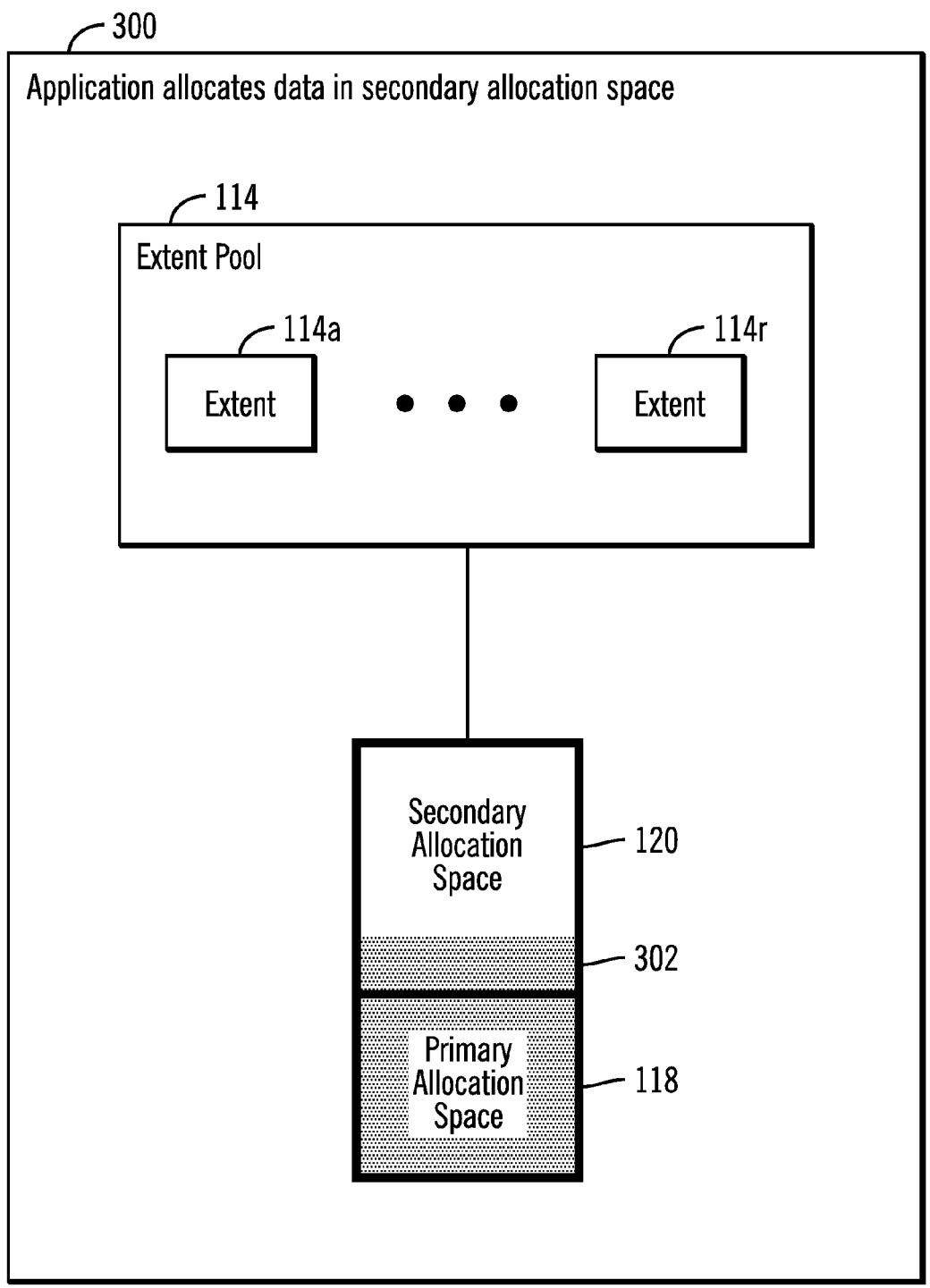
FIG. 3 illustrates a block diagram that shows how an application allocates data in the secondary allocation space, in accordance with certain embodiments.

FIG. 3 illustrates a block diagram 300 that shows how an application (such as the host application 106) allocates data in the secondary allocation space 120, in accordance with certain embodiments. After the secondary allocation space 120 is allocated data is written into the secondary allocation space 120 and the partial filling of the secondary allocation space 120 is shown by the shaded area 302.

Figure 4:
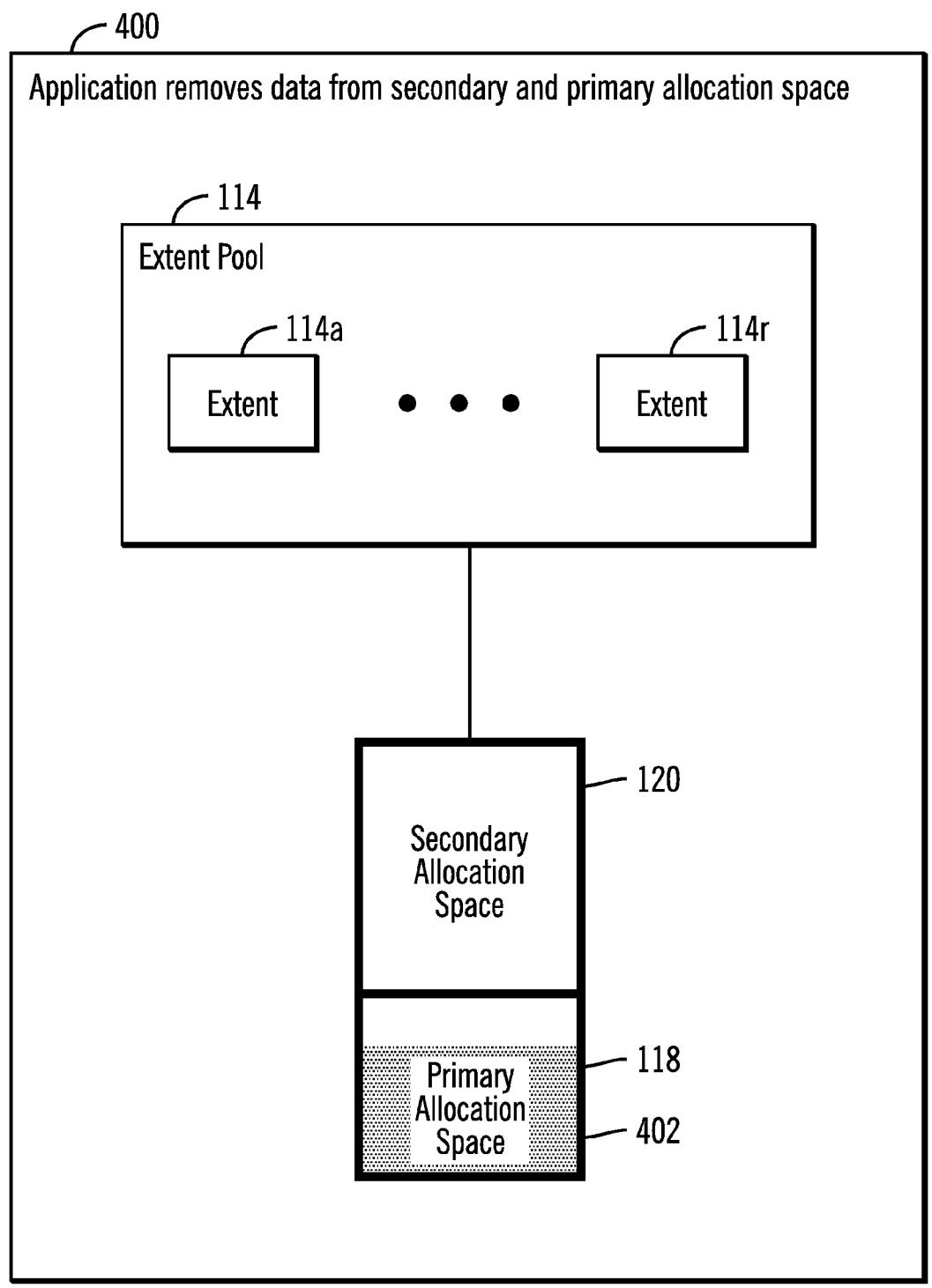
FIG. 4 illustrates a block diagram that shows how an application removes data from the secondary and the primary allocation space, in accordance with certain embodiments.

FIG. 4 illustrates a block diagram 400 that shows how an application (such as the host application 106) removes data from the secondary allocation space 120 and the primary allocation space 118, in accordance with certain embodiments. After the removal of data only a partial area of the primary allocation space 118 is full as shown via reference numeral 402.

Figure 5:
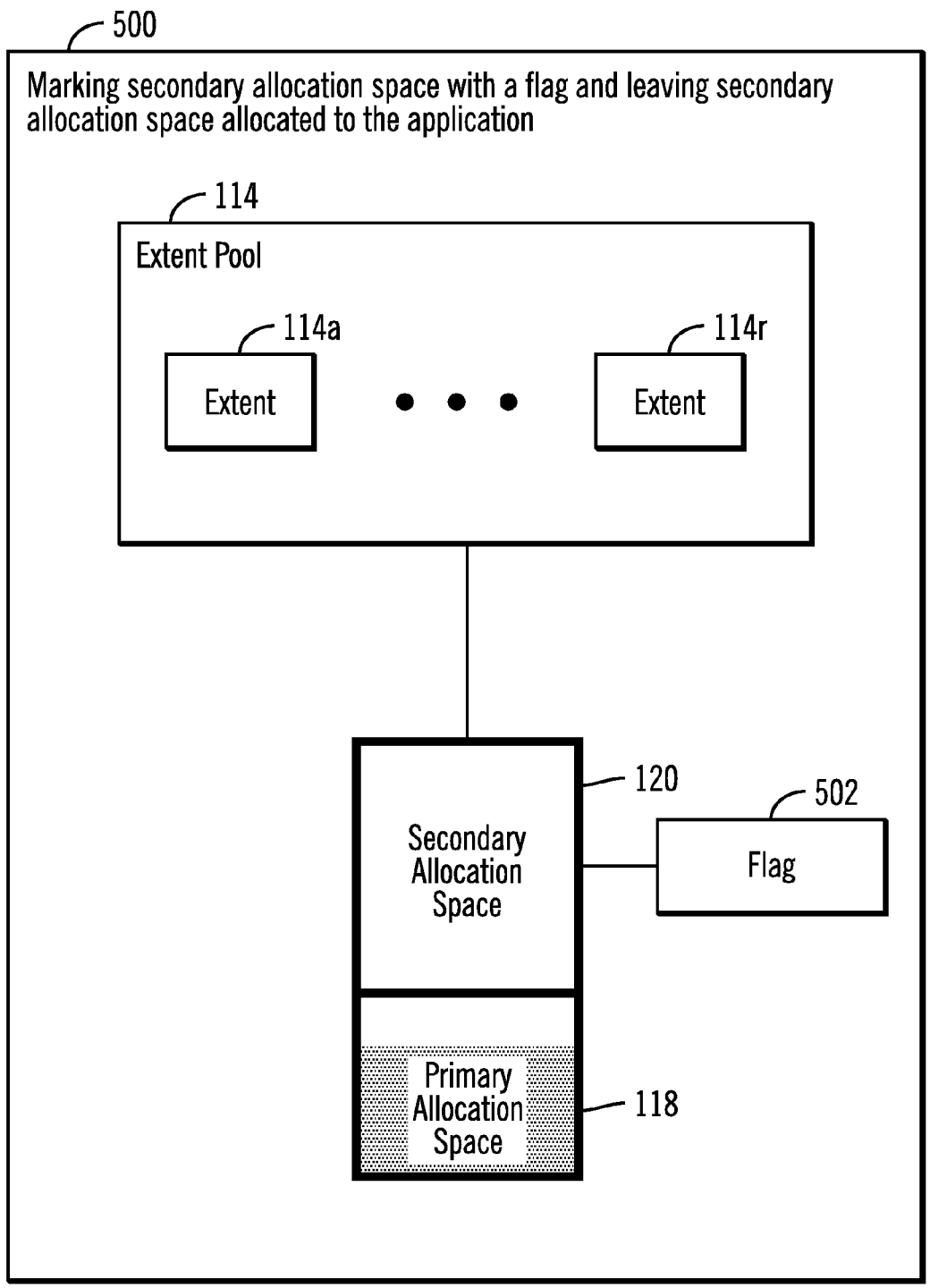
FIG. 5 illustrates a block diagram that shows how a secondary allocation space is marked with a flag to leave the secondary allocation space allocated to an application, in accordance with certain embodiments.

FIG. 5 illustrates a block diagram 500 that shows how a secondary allocation space 120 is marked with a flag 502 (or some other indicator) to leave the secondary allocation space 120 allocated to an application (such as the host application 106), in accordance with certain embodiments. The flag 502 may signify that extents in the secondary allocation space 120 are empty. If the extent pool 114 is empty or below a threshold number of unallocated and physically freed extents (or if a predetermined duration of time has elapsed since the secondary allocation space 120 is empty), then the extent pool 114 takes extents from the flagged secondary allocation space 120.

Therefore FIGS. 2-5 illustrate certain embodiments in which the secondary allocation space 120 is marked with an indicator (such as a flag or some other indicator) to indicate that the extents allocated to the secondary allocation space 120 may be available to the extent pool 114, without the extents allocated to the secondary allocation space 120 being released. Should unallocated physically freed extents be needed in the extent pool or after the elapse of a predetermined duration of time, the extents may be released from the secondary allocation space 120.

Figure 6:
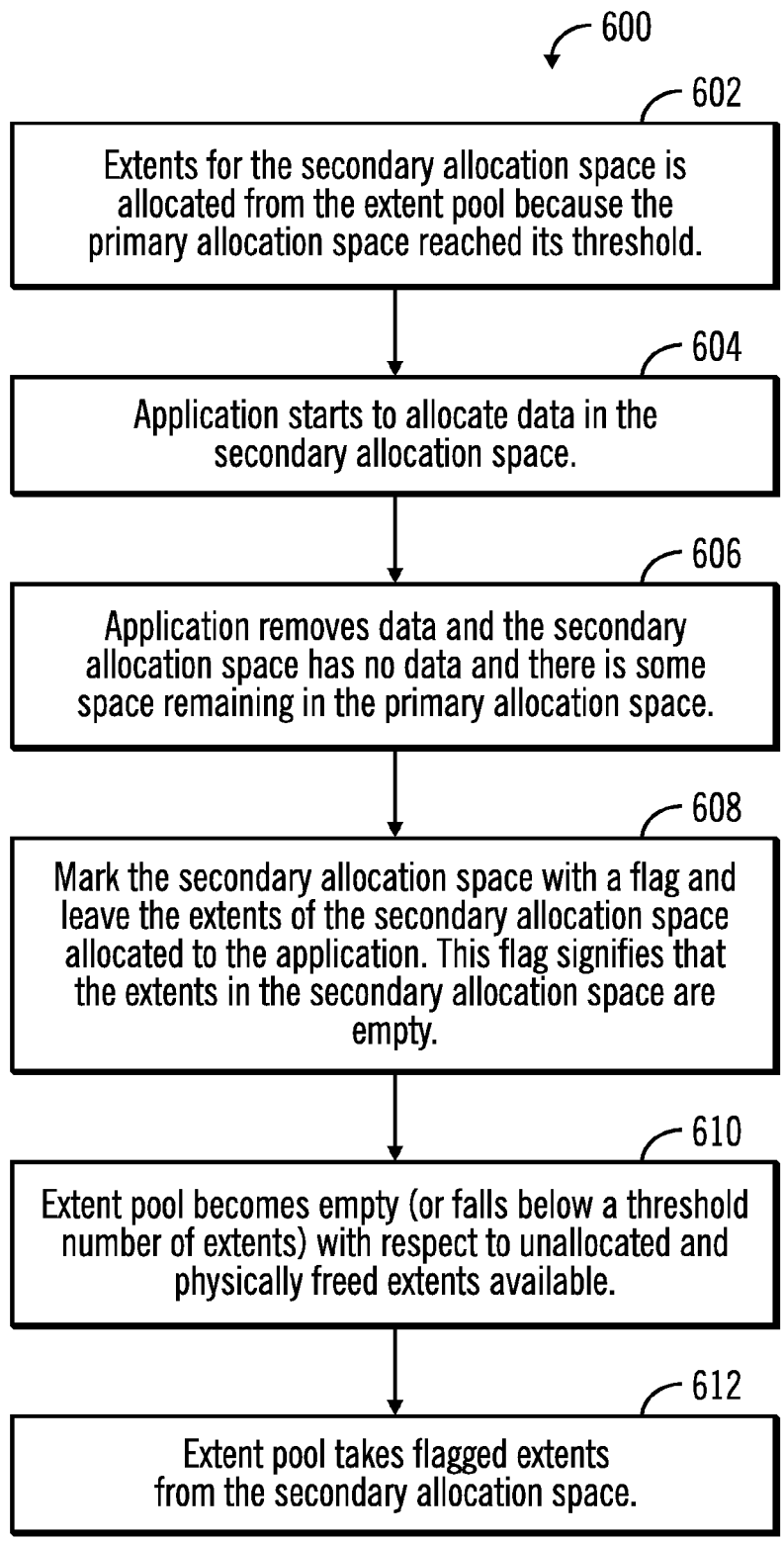
FIG. 6 illustrates a first flowchart that shows operations performed for managing space efficient storage volumes, in accordance with certain embodiments.

FIG. 6 illustrates a first flowchart 600 that shows operations performed for managing space efficient storage volumes, in accordance with certain embodiments.

Control starts at block 602 in which extents for the secondary allocation space 120 is allocated from the extent pool 114 because the primary allocation space 118 has reached its threshold. The application starts to allocate (at block 604) data in the secondary allocation space 120. Then the application removes data and the secondary allocation space 120 has no date and there is also some space remaining in the primary allocation space (at block 606).

Control proceeds to block 608 in which the secondary allocation space 120 is marked with a flag 502 and the extents of the secondary allocation space 120 are allocated to the application (e.g., the host application 106). This flag 502 signifies that the extents in the secondary allocation space 120 are empty.

Control proceeds to block 610 in which a determination is made that the extent pool has become empty or fallen below a threshold number of extents with respect to unallocated and physically freed extents that are available in the extent pool 114. In such a situation the extent pool 114 takes flagged extents from the secondary allocation space 120 (at block 610).

Figure 7:
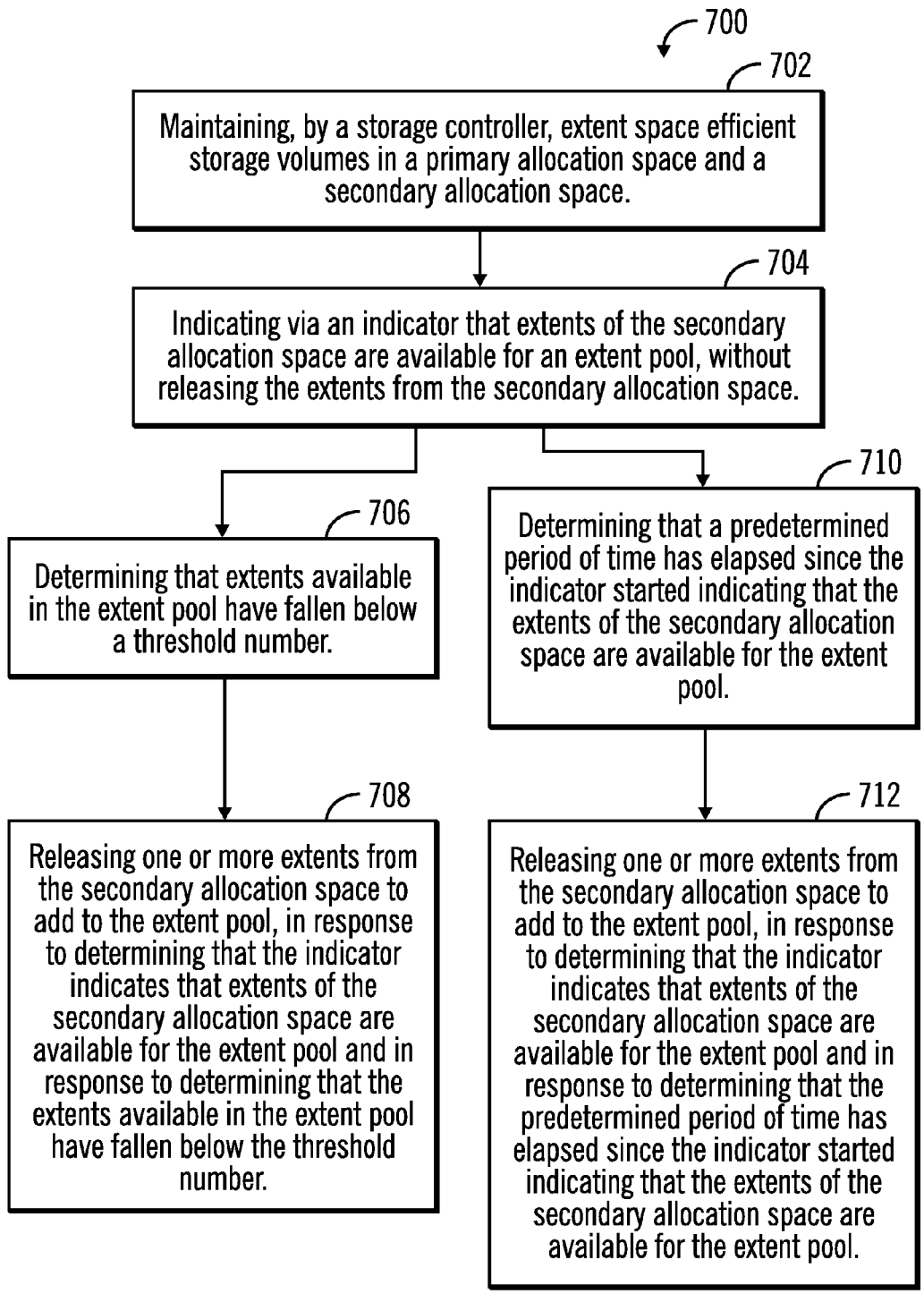
FIG. 7 illustrates a second flowchart that shows operations performed for managing space efficient storage volumes, in accordance with certain embodiments.

FIG. 7 illustrates a second flowchart 700 that shows operations performed for managing space efficient storage volumes, in accordance with certain embodiments. The operations shown in FIG. 7 are performed by the storage controller application 108 and/or the host application 106.

Control starts at block 702, in which a storage controller 102 maintains extent space efficient storage volumes 112 in a primary allocation space 118 and a secondary allocation space 120. An indicator 502 is used to indicate (at block 704) that extents of the secondary allocation space 120 are available for an extent pool 114, without releasing the extents from the secondary allocation space 120.

From block 704 control proceeds in parallel to block 706 and 708. At block 708, a determination is made that extents available in the extent pool 114 have fallen below a threshold number. One or more extents are released from the secondary allocation space 120 to add to the extent pool 114, in response to determining that the indicator 502 indicates that extents of the secondary allocation space 120 are available for the extent pool 114 and in response to determining that the extents available in the extent pool 114 have fallen below the threshold number (at block 708).

At block 710, a determination is made that a predetermined period of time has elapsed since the indicator 502 started indicating that the extents of the secondary allocation space 120 are available for the extent pool 114. One or more extents are released from the secondary allocation space 120 to add to the extent pool 114, in response to determining that the indicator 502 indicates that extents of the secondary allocation space 120 are available for an extent pool 114 and in response to determining that the predetermined period of time has elapsed since the indicator 502 started indicating that the extents of the secondary allocation space 120 are available for the extent pool (at block 712). For the purposes of this disclosure, an extent being available for the extent pool 114 means that that the extent that is available may use provided to some other application by the extent pool 114.

Therefore, FIGS. 1-7 illustrate certain embodiments in which a delay is created in the release of extents from a secondary space allocation 120 when thin provisioned storage volumes are used, in order to prevent thrashing. Extents that are empty in the secondary space allocation 120 are flagged but are not released until needed by the extent pool 114 to provide to other applications or until a predetermined amount of time has elapsed such that the possibility of thrashing is remote.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
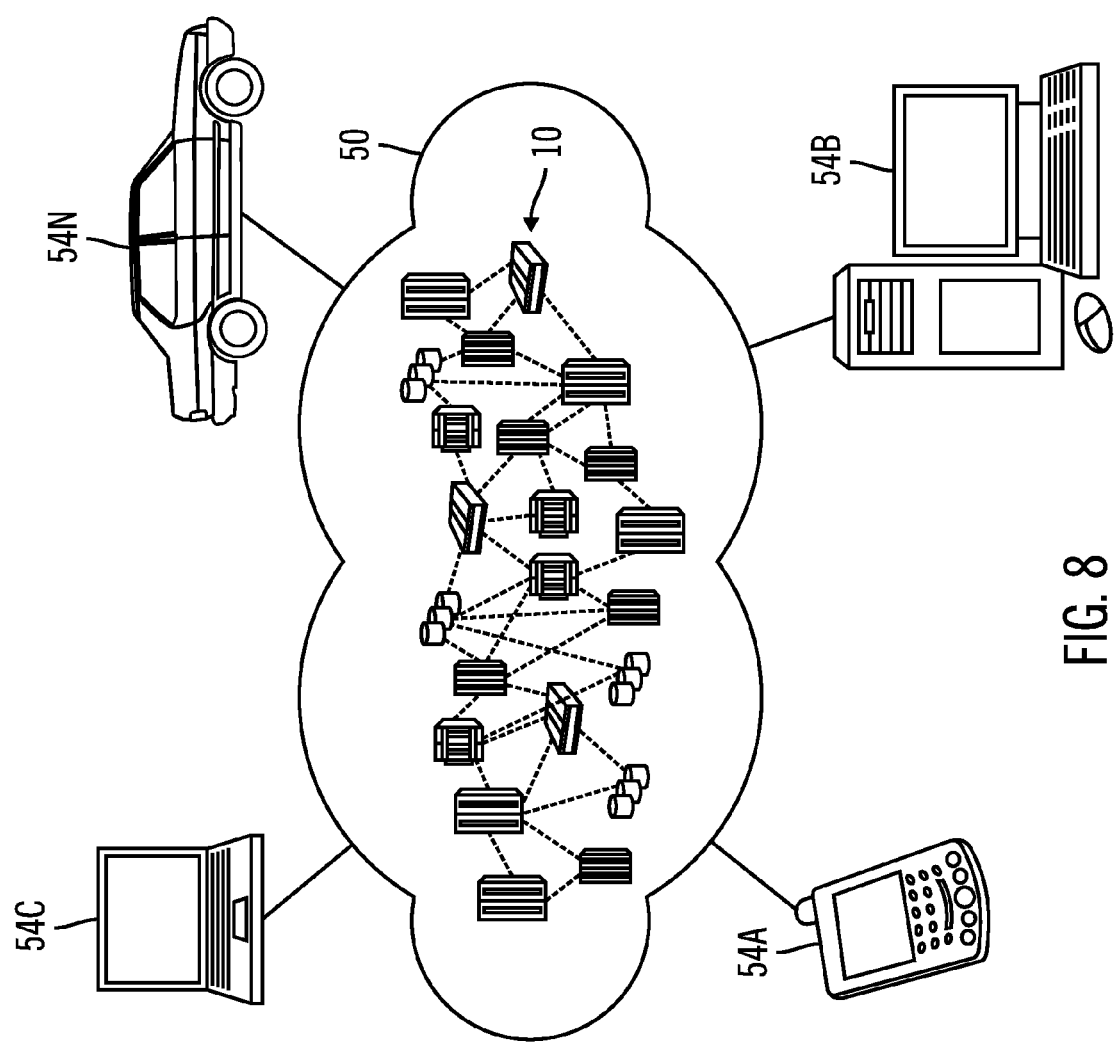
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
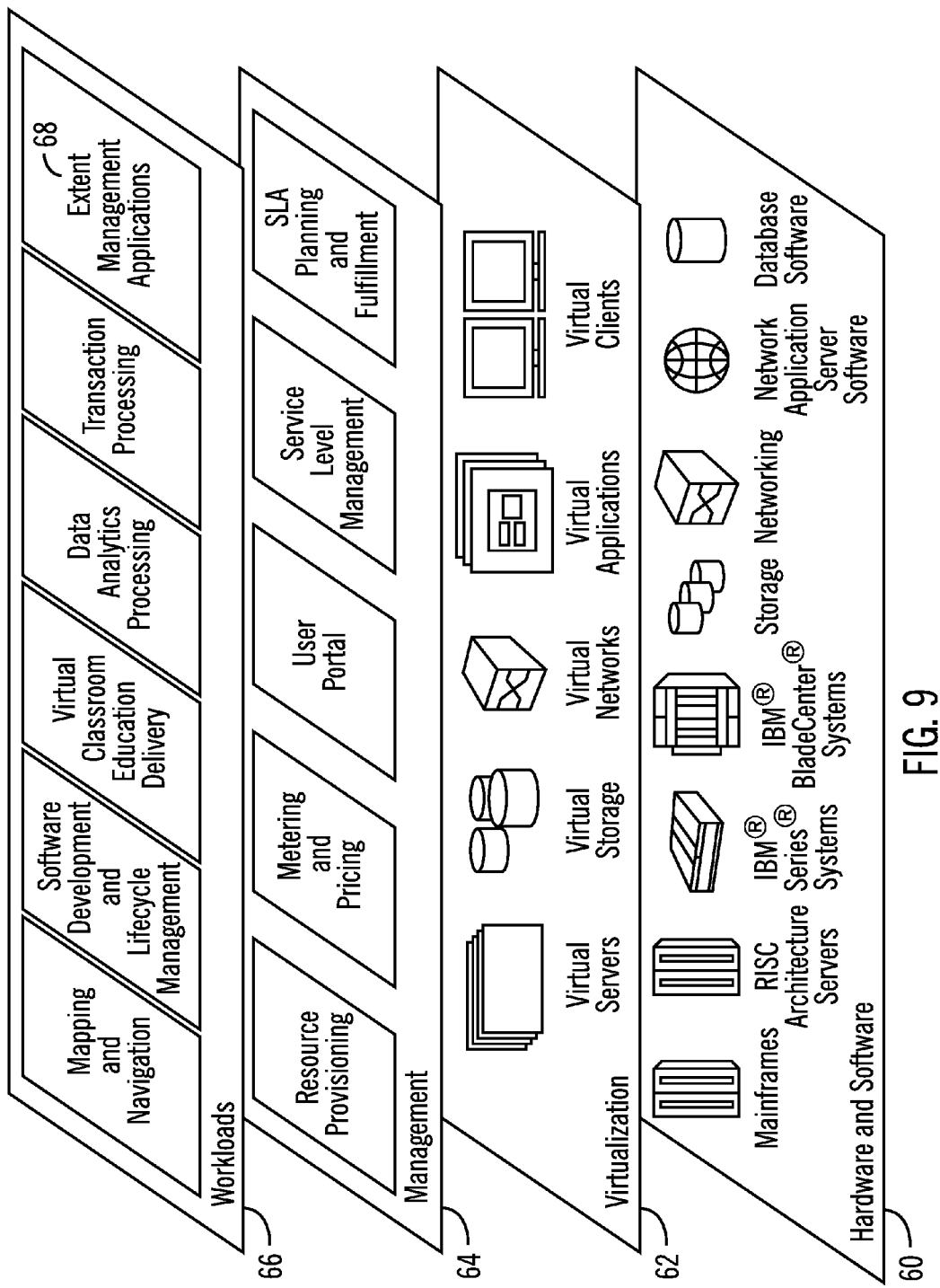
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the extent management applications 68 (e.g., the storage management application 108 and the host application 106) as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
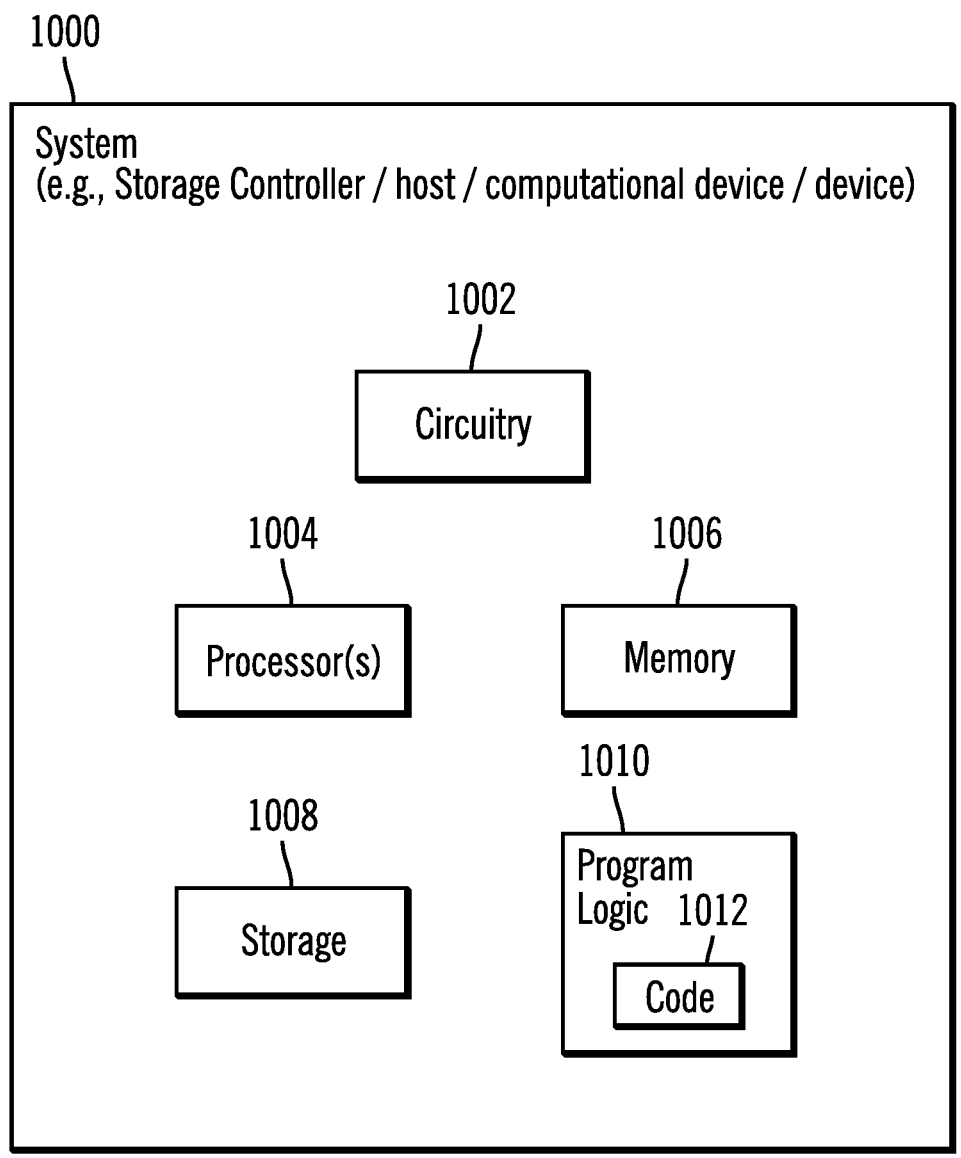
FIG. 10 illustrates a block diagram of a computational system that shows certain elements that may be included in the storage controller or the host shown in FIG. 1, in accordance with certain embodiments.

FIG. 10 illustrates a block diagram that shows certain elements that may be included in the host 104 or storage controller 102 in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. affiliates.

What is claimed is:

1. A method, comprising:
   maintaining, by a storage controller, extent space efficient storage volumes in a primary allocation space and a secondary allocation space;
   indicating via an indicator that extents of the secondary allocation space are available for an extent pool, without releasing the extents from the secondary allocation space;
   determining that a predetermined period of time has elapsed since the indicator started indicating that the extents of the secondary allocation space are available for the extent pool; and
   releasing one or more extents from the secondary allocation space to add to the extent pool, in response to determining that the indicator indicates that extents of the secondary allocation space are available for the extent pool and in response to determining that the predetermined period of time has elapsed since the indicator started indicating that the extents of the secondary allocation space are available for the extent pool.

2. The method of claim 1, wherein the primary allocation space and the secondary allocation space are allocated via an application, and the primary allocation space and the secondary allocation space are allocated to the application for use by the application.

3. The method of claim 1, wherein if the secondary allocation space is not marked with the indicator then extents in the secondary allocation space remain allocated for an application and are unavailable to the extent pool.

4. A method, comprising:
   maintaining, by a storage controller, extent space efficient storage volumes in a primary allocation space and a secondary allocation space; and
   indicating via an indicator that extents of the secondary allocation space are available for an extent pool, without releasing the extents from the secondary allocation space, wherein:
   the secondary allocation space is allocated to an application, in response to the primary allocation space being full; and
   data is written to the secondary allocation space subsequent to the secondary allocation space being allocated, and the primary allocation space being full.

5. The method of claim 4, wherein the extent pool is comprised of extents physically stored in one or more storage devices coupled to the storage controller.

6. The method of claim 4, the method further comprising:
   determining that extents available in the extent pool have fallen below a threshold number; and
   releasing one or more extents from the secondary allocation space to add to the extent pool, in response to determining that the indicator indicates that extents of the secondary allocation space are available for the extent pool and in response to determining that the extents available in the extent pool have fallen below the threshold number.

7. A system, comprising:
   a memory; and
   a processor coupled to the memory, wherein the processor performs operations, the operations comprising:
   maintaining extent space efficient storage volumes in a primary allocation space and a secondary allocation space;
   indicating via an indicator that extents of the secondary allocation space are available for an extent pool, without releasing the extents from the secondary allocation space;
   determining that a predetermined period of time has elapsed since the indicator started indicating that the extents of the secondary allocation space are available for the extent pool; and
   releasing one or more extents from the secondary allocation space to add to the extent pool, in response to determining that the indicator indicates that extents of the secondary allocation space are available for the extent pool and in response to determining that the predetermined period of time has elapsed since the indicator started indicating that the extents of the secondary allocation space are available for the extent pool.

8. The system of claim 7, wherein the primary allocation space and the secondary allocation space are allocated via an application, and the primary allocation space and the secondary allocation space are allocated to the application for use by the application.

9. The system of claim 7, wherein if the secondary allocation space is not marked with the indicator then extents in the secondary allocation space remain allocated for an application and are unavailable to the extent pool.

10. A system, comprising:
    a memory; and
    a processor coupled to the memory, wherein the processor performs operations, the operations comprising:
    maintaining extent space efficient storage volumes in a primary allocation space and a secondary allocation space; and
    indicating via an indicator that extents of the secondary allocation space are available for an extent pool, without releasing the extents from the secondary allocation space, wherein:

the secondary allocation space is allocated to an application, in response to the primary allocation space being full; and data is written to the secondary allocation space subsequent to the secondary allocation space being allocated, and the primary allocation space being full.

11. The system of claim 10, the operations further comprising:

determining that extents available in the extent pool have fallen below a threshold number; and releasing one or more extents from the secondary allocation space to add to the extent pool, in response to determining that the indicator indicates that extents of the secondary allocation space are available for the extent pool and in response to determining that the extents available in the extent pool have fallen below the threshold number.

12. The system of claim 10, wherein the system comprises a storage controller, and wherein the extent pool is comprised of extents physically stored in one or more storage devices coupled to the storage controller.

13. A computer program product, the computer program product comprising a computer readable storage medium having computer readable program code embodied therewith, the computer readable program code configured to perform operations on a processor, the operations comprising:

maintaining, by a storage controller, extent space efficient storage volumes in a primary allocation space and a secondary allocation space;

indicating via an indicator that extents of the secondary allocation space are available for an extent pool, without releasing the extents from the secondary allocation space;

determining that a predetermined period of time has elapsed since the indicator started indicating that the extents of the secondary allocation space are available for the extent pool; and releasing one or more extents from the secondary allocation space to add to the extent pool, in response to determining that the indicator indicates that extents of the secondary allocation space are available for the extent pool and in response to determining that the predetermined period of time has elapsed since the indicator started indicating that the extents of the secondary allocation space are available for the extent pool.

14. The computer program product of claim 13, wherein the primary allocation space and the secondary allocation space are allocated via an application, and the primary allocation space and the secondary allocation space are allocated to the application for use by the application.

15. The computer program product of claim 13, wherein if the secondary allocation space is not marked with the indicator then extents in the secondary allocation space remain allocated for an application and are unavailable to the extent pool.

16. A computer program product, the computer program product comprising a computer readable storage medium having computer readable program code embodied therewith, the computer readable program code configured to perform operations on a processor, the operations comprising:

maintaining, by a storage controller, extent space efficient storage volumes in a primary allocation space and a secondary allocation space; and indicating via an indicator that extents of the secondary allocation space are available for an extent pool, without releasing the extents from the secondary allocation space, wherein:

the secondary allocation space is allocated to an application, in response to the primary allocation space being full; and data is written to the secondary allocation space subsequent to the secondary allocation space being allocated, and the primary allocation space being full.

17. The computer program product of claim 16, the operations further comprising:

determining that extents available in the extent pool have fallen below a threshold number; and releasing one or more extents from the secondary allocation space to add to the extent pool, in response to determining that the indicator indicates that extents of the secondary allocation space are available for the extent pool and in response to determining that the extents available in the extent pool have fallen below the threshold number.

18. The computer program product of claim 16, wherein the extent pool is comprised of extents physically stored in one or more storage devices coupled to the storage controller.

* * * * *